B. Jennings,
Gang Plow.

No. 97,646. Patented Dec. 7, 1869.

Witnesses.
Geo. H. Strong
J. L. Boone

Inventor:
Byron Jennings
Pr Dewey & Co
atty.

United States Patent Office.

BYRON JENNINGS, OF GILROY, CALIFORNIA, ASSIGNOR TO HIMSELF AND HENRY W. BRIGGS, OF SAME PLACE.

Letters Patent No. 97,646, dated December 7, 1869; antedated December 1, 1869.

IMPROVEMENT IN GANG-PLOWS.

The Schedule referred to in these Letters Patent and making part of the same.

*To all whom it may concern:*

Be it known that I, BYRON JENNINGS, of Gilroy, county of Santa Clara, State of California, have invented an Improved Gang-Plow; and I do hereby declare the following description and accompanying drawings are sufficient to enable any person skilled in the art or science to which it most nearly appertains, to make and use my said invention or improvement, without further invention or experiment.

My invention relates to certain new improvements in that class of gang-plows in which the plow-frame is made separate and attached to a truck; and It consists in an improved manner of operating the plow-frame in order to raise it and clear the plow from the ground.

It also consists in an improved manner of attaching the frame to the truck, so that the operation of raising and lowering the frame is much simplified, and the amount of power required to be exerted is greatly reduced.

To more fully illustrate and explain my invention, reference is had to the accompanying drawings, forming a part of this specification, of which—

Similar letters of reference, in each of the figures, indicate like parts.

A is the frame, to which the plows are attached, and

B, the truck.

In the usual form of constructing these plows, the two are connected by a link-joint, which, in connection with adjustable rods, enables the driver to hold the frame at variable heights, parallel with the ground.

In this plow, a shaft, C, extends along the axle, and parallel to it, turning in clasps, *a a*, or other equivalent device, and has a lever, D, attached at one end.

Extending from this shaft are two short arms, *b b*, the ends of which are connected with the plates *d d* on the sides of the timbers of the plow-frame.

The plates *d d* have two or more holes *e e* in their ends, and a rod passes through one of the holes and a hole in the end of the arms *b b* on each side.

By attaching the arms *b b* in the upper or lower holes, the depth to which the plows cut is regulated.

A curved arm or lever, E, rises from the shaft C, to which the usual levers by which the plow-frame is elevated, are attached.

To the lower end of this lever is attached a curved bar, *g*, which passes down along the pole and inside of a guide, *h*, which is attached above and below the pole P'.

On the opposite side of the pole is attached a bent lever, F, which has a vertical lug, *i*, depending from the horizontal portion of the curve.

Figure 1:
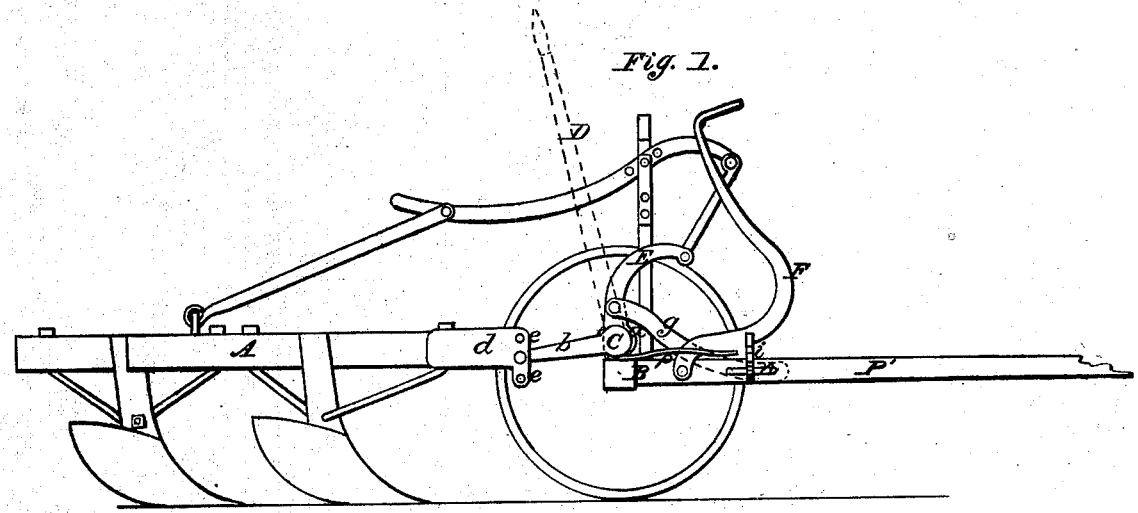
Figure 1 is a side-view.
Figure 2:
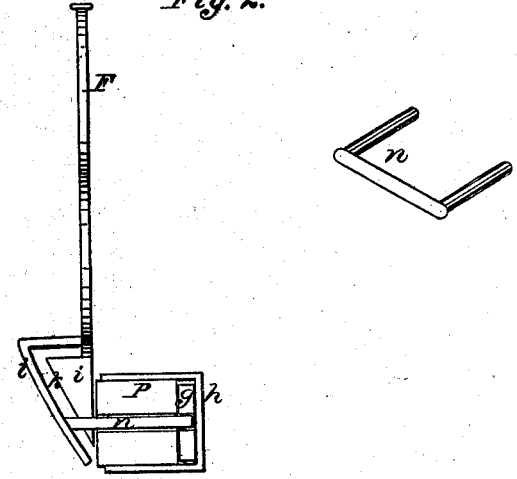
Figure 2 is an enlarged view of the device for drawing the pin which holds the slide-bar.

This lug is provided with an inclined slot, as shown at K, fig. 2.

A staple or bent pin, *n*, passes through the pole from this side, entering holes in the bar *g* and guide *h*, and is drawn by the lug *i*, the bent portion entering the inclined slot.

The lever F extends upward, and is bent at right angles at the top, so as to furnish a suitable bearing-surface for the foot of the driver in operating it, and a spring, *p*, keeps it to its proper position.

To raise the frame, the lever F is depressed with the foot of the driver; this causes the lug *i* to draw the pin *n* and release the sliding-bar *g*, when, by throwing the lever D toward the front, the shaft C is caused to turn, elevating the front end of the frame by means of the arms *b b*, and also raising the rear end by means of the series of levers attached to the curved arm E.

When the lever F is released, the bent pin or staple is thrown back to its place by the inclined slot, thus fixing the levers in their position.

This manner of drawing a straight pin I claim as being an entirely new device, as the pin is both drawn and forced back to its place by the lug, and it can be applied to various uses with the same result.

By this construction, the depth to which it is desired to plow is easily regulated, while the entire operation of elevating the plows out of the ground is brought more directly under the control of the driver.

Having thus described my invention,

What I claim, and desire to secure by Letters Patent, is—

1. The combination, with the arms *b*, on the shaft C, of the plates *d*, provided with holes *e*, for making their connection adjustable, substantially as and for the purpose set forth.

2. The curved arm E, attached to the shaft C, sliding-bar *g*, and guide *h*, substantially as and for the purpose described.

3. The bent lever F, with its slotted inclined lug *i*, together with the bent pin or staple *n*, substantially as described.

In witness whereof, I have hereunto set my hand and seal.

BYRON JENNINGS. [L. S.]

Witnesses:
A. H. KENNEDY,
G. U. KIDDEY.